(12) United States Patent
Levin (10) Patent No.: US 7,814,111 B2
(45) Date of Patent: Oct. 12, 2010

(54) DETECTION OF PATTERNS IN DATA RECORDS

(75) Inventor: Boris I. Levin, Rishon Le-Zion (IL)

(73) Assignee: Microsoft International Holdings B.V., Amsterdam (NL)

( * ) Notice: Subject to any disclaimer, the term of this patent is extended or adjusted under 35 U.S.C. 154(b) by 312 days.

(21) Appl. No.: 11/649,540

(22) Filed: Jan. 3, 2007

(65) Prior Publication Data

US 2007/0156749 A1 Jul. 5, 2007

Related U.S. Application Data

(60) Provisional application No. 60/756,150, filed on Jan. 3, 2006.

(51) Int. Cl.
*G06F 17/30* (2006.01)

(52) U.S. Cl. .......................... 707/756; 726/22

(58) Field of Classification Search ........................ None
See application file for complete search history.

(56) References Cited

U.S. PATENT DOCUMENTS

| | | | |
|---|---|---|---|
| 5,251,131 A | 10/1993 | Masand et al. | |
| 6,393,427 B1 | 5/2002 | Vu et al. | |
| 6,411,952 B1 * | 6/2002 | Bharat et al. | ................... 707/5 |
| 6,751,600 B1 | 6/2004 | Wolin | |
| 2003/0106058 A1 * | 6/2003 | Zimmerman et al. | ........... 725/46 |
| 2003/0200198 A1 * | 10/2003 | Chandrasekar et al. | ......... 707/1 |
| 2005/0149546 A1 | 7/2005 | Prakash et al. | |
| 2006/0242180 A1 * | 10/2006 | Graf et al. | ................... 707/101 |

OTHER PUBLICATIONS

U.S. Appl. No. 60/756,150.
U.S. Appl. No. 60/756,139.
U.S. Appl. No. 60/815,623.
Levin, B., and Rosenstein, J. "Zoomix: Self-Learning Matching Technology". Jul. 2006.
"Master Data Quality". http://www.zoomix.com/mdq.asp.

* cited by examiner

*Primary Examiner*—Apu M Mofiz
*Assistant Examiner*—Anteneh Girma
(74) *Attorney, Agent, or Firm*—Wolf, Greenfield & Sacks, P.C.

(57) ABSTRACT

A computer-implemented method for processing data includes receiving an input from a user including positive examples and negative examples of a specified data type. The positive examples include first character strings that belong to the specified data type, and the negative examples include second character strings that do not belong to the specified data type. The first and second character strings are processed to create a set of attributes that characterize the positive examples. A decision tree is built, based on the attributes, which when applied to the first and second strings, distinguishes the positive examples from the negative examples. The decision tree is applied to the data so as to identify occurrences of the specified data type.

36 Claims, 3 Drawing Sheets

DETECTION OF PATTERNS IN DATA RECORDS

CROSS-REFERENCE TO RELATED APPLICATION

This application claims the benefit of U.S. Provisional Patent Application 60/756,150, filed Jan. 3, 2006, which is incorporated herein by reference.

FIELD OF THE INVENTION

The present invention relates generally to data processing, and specifically to methods and systems for extracting information from collections of data.

BACKGROUND OF THE INVENTION

Companies and other organizations commonly maintain large quantities of data in different databases and in different formats (even within the same database). Data mastering—compiling diverse data into a single, unified database while eliminating duplication and errors—has become increasingly important in ensuring data quality and accessibility. A number of software-based tools are available for automated data mastering, such as Zoomix ONE, produced by Zoomix Data Mastering Ltd. (Jerusalem, Israel).

One of the challenges of data mastering is that the same type of data may be stored in different formats. For example, calendar dates may be written out in words or in numbers, with the day, month and year in different orders, separated by different types of punctuation. Effective data mastering requires that the system be able to recognize and parse all the different formats. Systems known in the art have typically relied on users to explicitly create rules (often in the form of regular expressions) to define all of the accepted formats.

SUMMARY OF THE INVENTION

Explicit rule creation is time-consuming and requires programming expertise. Furthermore, even an expert programmer may not be able to foresee all of the different formats corresponding to a certain data type. There is therefore a need for a tool that can automatically detect patterns of a specified type of data and create rules for identifying data of the specified type in a database or other repository. This sort of automatic detection and rule creation is particularly useful in data mastering, but it may also be used in other data processing applications, such as data mining and knowledge extraction from both databases and unstructured bodies of information.

In the embodiments of the present invention that are described hereinbelow, a user marks positive and negative examples of a data pattern in a repository. The term "pattern," in the context of the present patent application and in the claims, means a format or group of formats that characterize the set of character strings that constitute data entries of a certain type. The positive examples are character strings that belong to the data type in question, whereas the negative examples are character strings that do not belong to this data type. A pattern processor uses the positive and negative examples to automatically build a decision tree that distinguishes the positive from the negative examples.

This decision tree may then be applied to unknown data in order to identify occurrences of the pattern embodied in the decision tree. Optionally, the user may mark errors in the extracted data, i.e., negative examples that fit the pattern and/or positive examples that the pattern missed. The pattern processor may then use these errors to refine the decision tree.

There is therefore provided, in accordance with an embodiment of the present invention, a computer-implemented method for processing data, including:

receiving an input from a user including positive examples and negative examples of a specified data type, the positive examples including first character strings that belong to the specified data type, and the negative examples including second character strings that do not belong to the specified data type;

processing the first and second character strings to create a set of attributes that characterize the positive examples;

building a decision tree, based on the attributes, which when applied to the first and second strings, distinguishes the positive examples from the negative examples; and applying the decision tree to the data so as to identify occurrences of the specified data type.

Typically, receiving the input includes displaying a collection of the character strings, and accepting from the user an indication of which of the character strings to include in the specified data type and which of the character strings to exclude from the specified data type.

In a disclosed embodiment, each of the character strings includes one or more character sequences, each character sequence having a length and including characters of a single, given character type, and processing the first and second character strings includes encoding each character string to indicate character types and lengths of the character sequences in the character string. Typically, processing the first and second character strings includes identifying code sequences in the character strings, the code sequences including ordered groups of two or more of the character sequences that include different, respective character types.

In one embodiment, processing the first and second character strings includes choosing the attributes such that at least a predetermined fraction of the positive examples is characterized by the chosen attributes, and such that a larger fraction of the positive examples than of the negative examples is characterized by the chosen attributes.

In some embodiments, building the decision tree includes choosing splitting conditions for application at the nodes of the decision tree so that the decision tree is an optimal decision tree. Typically, the decision tree includes a root node, internal nodes, and leaf nodes, and choosing the splitting conditions includes finding a respective optimal splitting condition at the root node and at each of the internal nodes. In one embodiment, finding the respective optimal splitting condition includes, at each node among the root and internal nodes, choosing one of the attributes and the optimal splitting condition for application to the one of the attributes so as to maximize an optimization criterion for separating the positive examples contained in the node from the negative examples contained in the node.

Additionally or alternatively, building the decision tree includes determining one of the nodes to be a leaf node when the node contains only positive examples or only negative examples. Further additionally or alternatively, building the decision tree includes determining one of the nodes to be a leaf node when there is splitting condition that will separate the positive examples contained in the leaf node from the negative examples contained in the leaf node with an effectiveness greater than a predetermined minimum optimization criterion.

Applying the decision tree may include receiving further input from the user indicating errors made by the decision tree in identifying the occurrences of the specified data type, and refining the decision tree using the further input.

In a disclosed embodiment, applying the decision tree, includes constructing a regular expression based on the decision tree, and applying the regular expression to the data.

Additionally or alternatively, applying the decision tree to the data includes using the occurrences of the specified data type to identify duplications in records in a database, and resolving the duplications.

There is also provided, in accordance with an embodiment of the present invention, apparatus for processing data, including:

a user interface, which is coupled to receive an input from a user including positive examples and negative examples of a specified data type, the positive examples including first character strings that belong to the specified data type, and the negative examples including second character strings that do not belong to the specified data type; and a pattern processor, which is arranged to process the first and second character strings to create a set of attributes that characterize the positive examples, to build a decision tree, based on the attributes, which when applied to the first and second strings, distinguishes the positive examples from the negative examples, and to apply the decision tree to the data so as to identify occurrences of the specified data type.

There is additionally provided, in accordance with an embodiment of the present invention, a computer software product for processing data, the product including a computer-readable medium in which program instructions are stored, which instructions, when read by a computer, cause the computer to receive an input from a user including positive examples and negative examples of a specified data type, the positive examples including first character strings that belong to the specified data type, and the negative examples including second character strings that do not belong to the specified data type, to process the first and second character strings to create a set of attributes that characterize the positive examples, to build a decision tree, based on the attributes, which when applied to the first and second strings, distinguishes the positive examples from the negative examples, and to apply the decision tree to the data so as to identify occurrences of the specified data type.

The present invention will be more fully understood from the following detailed description of the embodiments thereof, taken together with the drawings in which:

DETAILED DESCRIPTION OF EMBODIMENTS

Figure 1:
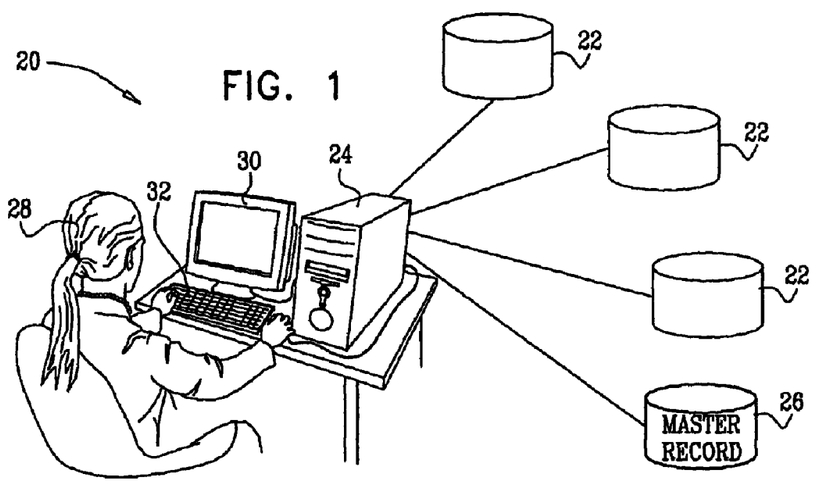
FIG. 1 is a block diagram that schematically illustrates a system for data mastering, in accordance with an embodiment of the present invention.

FIG. 1 is a block diagram that schematically illustrates a system 20 for data mastering, in accordance with an embodiment of the present invention. A pattern processor 24 reads data records from one or more source repositories 22, processes the records to eliminate duplication and errors, and then writes clean master data to a master repository 26. Typically, repositories 22 and 26 comprises databases. More generally, however, these repositories may comprise data structures of other types, as well as unstructured data. Processor 24 typically comprises a general-purpose computer, which is programmed in software to carry out the functions described herein. The software may be downloaded to the processor in electronic form, over a network, for example, or it may alternatively be provided on tangible media, such as magnetic, optical or electronic memory media.

One of the operations performed by processor 24 is automated generation of classification rules for detecting patterns corresponding to certain data types that occur in the data records. The rules typically have the form of a decision tree or an equivalent regular expression, as described hereinbelow. In generating the rules, processor 24 uses examples of the patterns that are input by a user 28 via a user interface, which typically comprises an input device, such as a keyboard 32 or a mouse (not shown), and an output device, such as a monitor 30. The processor applies the rules to the data in repositories 22 so as to extract occurrences of the specified data type.

For convenience and clarity, certain methods in accordance with embodiments of the present invention are described hereinbelow with reference to the data mastering functions of system 20. These methods may alternatively be applied, mutatis mutandis, in other areas in which data classification and pattern extraction are used. For instance, these methods can significantly improve the results of data normalization, since the same pattern often expresses the same attribute independently of the position of the field in which it is located. As one example, the pattern [digits]×[digits]×[digits] in many cases reflects the size of an item (length, width, and height) and can be located in different positions in a type description field.

Figure 2:
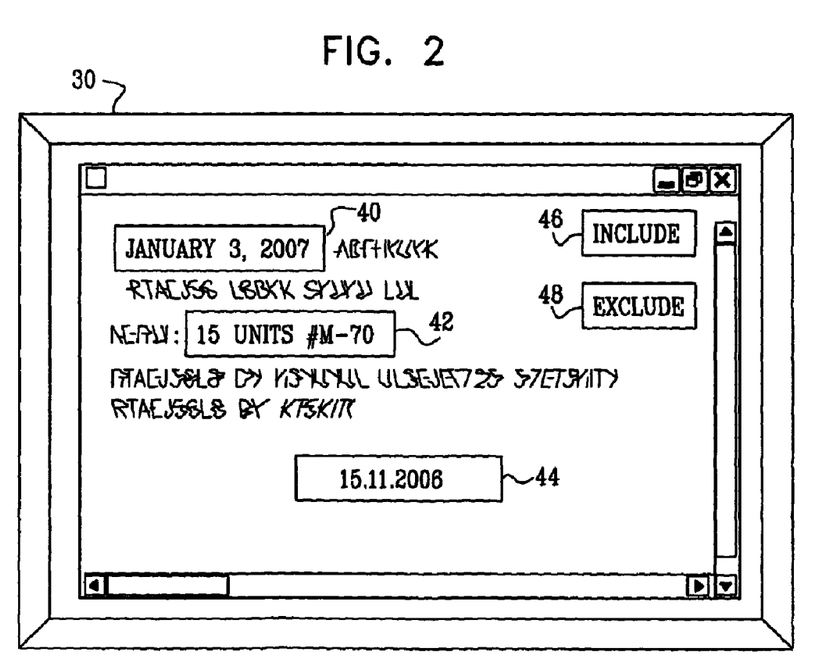
FIG. 2 is a schematic representation of a user interface screen for identifying examples to be used in automated pattern detection, in accordance with an embodiment of the present invention.

FIG. 2 is a schematic representation of a user interface screen appearing on monitor 30, in accordance with an embodiment of the present invention. User 28 interacts with this screen in order to mark and input to processor 24 positive and negative examples of a specified data type. In this case, the data type in question is assumed to be calendar dates. The user may key in the examples using keyboard 32 or, as in FIG. 2, may mark the examples in a text listing displayed on the monitor. Thus, the user highlights character strings 40 and 44, and then selects an "INCLUDE" control 46 to indicate that these are positive examples of the data type. The user highlights another character string 42, and then selects an "EXCLUDE" control to indicate that it is a negative example, i.e., that this string should not be identified as a date by the classification rule that the processor is to create. Although only a few examples are shown in the figure, the user typically inputs a large number of examples, including negative examples that are similar in form to the positive examples, so that the classification rules that the processor creates will be highly specific to the data type in question.

Figure 3:
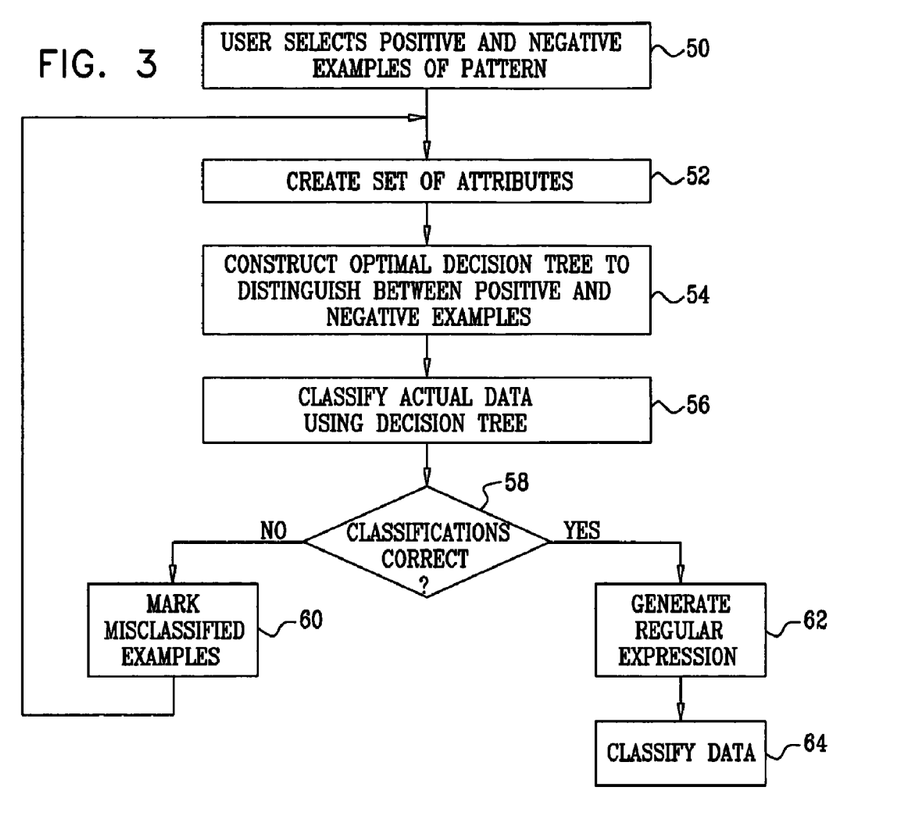
FIG. 3 is a flow chart that schematically illustrates a method for classifying data, in accordance with an embodiment of the present invention.

FIG. 3 is a flow chart that schematically illustrates a method for classifying data, in accordance with an embodiment of the present invention. The method begins with selection and input by a user of positive and negative examples of a pattern to be used in classification, at an example selection step 50. This step was described above with reference to FIG. 2. Processor 24 extracts a set of attributes from the examples, at an attribute creation step 52. Details of this step are described below with reference to FIG. 4. Generally speaking, the attributes comprise characteristics of the sequences of characters that occur in the examples input by the user. The characters typically include letters (l), digits (d), blank spaces (b), and special characters, such as punctuation marks. The processor thus encodes each of the examples as a set of attribute values, which are indicative of the sequence of characters in the example, along with a bit indicating whether the attribute belongs to a positive or negative example. Processor 24 analyzes the attribute values in order to identify common code sequences that occur in the positive examples more prevalently than in the negative examples (such as digits separated by certain punctuation marks in the calendar date example noted above).

Based on the analysis of the collected attributes, processor 24 builds a decision tree that distinguishes between the positive and negative examples, at a tree construction step 54. The decision tree, in other words, embodies rules according to which character strings may be classified as belonging to the specified data type, i.e., rules that characterize the data pattern in questions. Details of this step are described hereinbelow with reference to FIG. 5. (More generally, in complex cases, several decision trees may be built in this manner.)

Typically, at step 54, processor 24 attempts to build a decision tree that is optimal, in the sense that it sorts the positive examples from the negative examples in a minimal number of decision steps. The processor uses a top-down procedure for this purpose, such that each node of the tree separates the remaining positive examples from the remaining negative examples to the greatest extent possible. Each branch of the tree terminates at a leaf, at which all (or nearly all) of the remaining examples are either positive or negative, or at which no further attributes can be found that will effectively sort the remaining examples. Each leaf, in other words, corresponds to a sequence of conditions that are accumulated in traversing the tree from the root to the leaf, such that, if possible, only positive examples or only negative examples satisfy all the conditions. In some cases, it may not be possible to resolve all the leaves in this manner unambiguously, typically due to erroneous or ambiguous examples. In such cases, there may be one or more leaves that still have a certain small percentage of contradictory examples, wherein the percentage is less than a predetermined threshold.

Processor 24 applies the decision tree to an actual data sample, at a data classification step 56. The processor outputs a list of strings that were found to match the data pattern embodied in the decision tree, and may also output ancillary data, such as statistics regarding the total number of matches and their relative frequency. User 28 reviews the classification results, at a user review step 58. If the user finds any strings that have been incorrectly classified as fitting the pattern, the user may mark these strings, at a misclassification marking step 60. By the same token, if the user sees strings in the data sample that should have been classified as belonging to the specified data type, but were not, the user may mark these strings, as well. The marking at step 60 may use the same sort of interface screen and "include/exclude" technique as were described above with reference to FIG. 2.

Upon receiving the user inputs at step 60, processor 24 repeats steps 52-56 in order to generate a refined decision tree, which is then applied to a new data sample at step 58. These steps may be repeated multiple times until the processor develops a decision tree of the desired specificity, i.e., with percentages of false positive and false negative classifications that are below a user-determined threshold (or possibly with no false classifications at all). The decision tree may be even further refined, either automatically by the processor or manually by the user, by restricting the values of the letters and digits that are allowed in the pattern. For example, days of the month may be restricted to numbers no greater than thirty-one, while months may have numbers no greater than twelve.

After the decision tree has been fully defined, it is applied in sorting the data in repositories 22. For this purpose, it may be convenient to convert the decision tree into a regular expression, at a regular expression generation step 62. This step may be carried out automatically by processor 24, simply by traversing the nodes of the tree and collecting the respective conditions, using algorithms that are known in the art. Alternatively, other symbolic or logical representations of the decision tree may be used. The decision tree (as a regular expression or in other form) is then applied to the data in repositories 22, at a data classification step 64. If classification errors are detected at this stage, the user may mark the errors and instruct processor 24 to repeat steps 52-56 once again in order to refine the decision tree still further.

Figure 4:
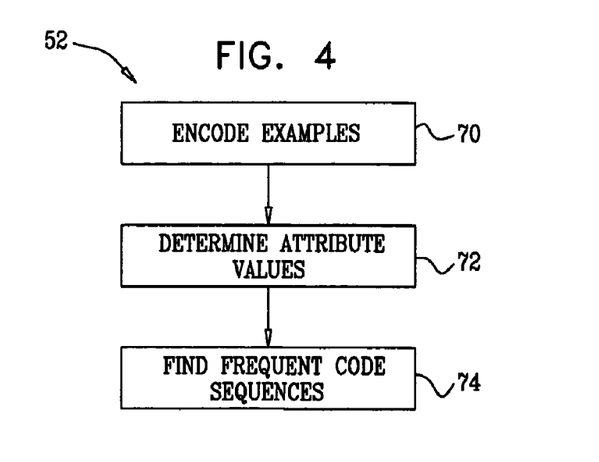
FIG. 4 is a flow chart that schematically illustrates a method for creating attributes for use in pattern detection, in accordance with an embodiment of the present invention.

FIG. 4 is a flow chart that schematically shows details of attribute creation step 52, in accordance with an embodiment of the present invention. Processor 24 encodes the set of initial expressions selected by the user, at an example encoding step 70. The initial expressions comprise the positive examples of the pattern and the negative examples, as well. For convenience, it will be assumed that the positive and negative examples are contained in a file named Initial_Expressions. The processor sequentially scans the characters of the expressions in the file Initial_Expressions so as to encode each expression in a structural form, which does not distinguish between different letters and between different digits. In other words, one code is assigned to all letters, and another code is assigned to all digits. Special characters, such as punctuation marks, are encoded individually, while spaces between characters are encoded separately as blanks.

An exemplary encoding scheme of this sort is shown in Table I below:

TABLE I

ENCODING OF INITIAL EXPRESSIONS

| Example | Initial Expression | Sequence of codes |
|---|---|---|
| 0 | 2000 | d |
| 1 | Hello | l |
| 2 | 333# | d# |
| 3 | W33333 | ld |
| 4 | 76 # | db# |
| 5 | 5002 28MM | dbdl |
| 6 | MAKITA DRILL GUIDE SET | lblblbl |

In the "Sequence of codes" column, d denotes digits, l denotes letters, b denotes a blank, and # is the code for #. Multiple sequential occurrences of the same character type are represented by a single code, as shown in the table above. This analysis thus determines, for each initial expression, the sequence of changes of characters within this expression.

Processor 24 may also perform a quantitative analysis of the initial expressions. This analysis determines the sequence of lengths of the different character types in each expression. The result of the quantitative analysis of the expressions in Table I is shown below in Table II:

TABLE II

QUANTITATIVE ANALYSIS OF INITIAL EXPRESSIONS

| Example | Initial Expression | Sequence of code lengths |
|---|---|---|
| 0 | 12000 | 4 |
| 1 | Hello | 5 |
| 2 | 333# | 3, 1 |
| 3 | W33333 | 1, 5 |
| 4 | 76 # | 2, 1, 1 |
| 5 | 5002 28MM | 4, 1, 2, 2 |
| 6 | MAKITA DRILL GUIDE SET | 6, 1, 5, 1, 5, 1, 3 |

For example, the expression "5002 28MM" is represented as four characters of one type (digits), followed by one character of another type (blank), followed by two characters of another type (digits), followed by two characters of another type (letters). The sum of lengths of codes in each row is equal to the total length of the corresponding initial expression. (For example, the total length of the expression '5002 28MM' is 9, which is equal to 4+1+2+2.)

The processor may transform the individual lengths $\{l_i, i=1, \ldots, L\}$ in each row into the corresponding sequence of accumulated lengths $$\left\{\hat{l}_i = \sum_{j=1}^{i} l_j, i = 1, \ldots, L\right\}.$$

In this manner, for example, {3,1} is transformed into {3,4}; {2,1,1} is transformed into {2,3,4}; and {4,1,2,2} is transformed into {4,5,7,9}. The numbers $\hat{l}_i$ are useful subsequently in aligning the different parts of expressions (whereby parts of different expressions in the same locations are extracted and investigated separately). In the above example, the most frequent value of $\hat{l}_i$ is 4, which can thus be considered as a possible position for alignment. The decision tree may be constructed in the form of sub-trees, which are applied to different parts the expressions in question, based on these alignment points.

Using the results of the qualitative and quantitative analysis described above, processor 24 computes the respective frequency of each character code and writes the codes and their respective frequencies to an array. The processor sorts the array in decreasing order of frequencies and assigns a frequency index to each code, so that the most frequent characters will have the smallest indices. Thus, the processor creates the array Basic_Codes [i].character.frequency.index, which contains the following three data items in each row: character code, frequency, index, wherein i=0, . . . , Total_Number_Of_Codes−1 (i.e., the total number of different character types in Initial_Expressions). An array of this sort corresponding to the initial expressions in Tables I and II is shown below in Table III:

TABLE III

ARRAY OF BASIC CODES

| Character code | Frequency | Index |
|---|---|---|
| l | 27 | 0 |
| d | 20 | 1 |
| b | 5 | 2 |
| # | 2 | 3 |

Processor 24 extracts a set of attribute values from the encoded examples (expressions), at an attribute extraction step 72. The purpose of this step is to identify features of the codes that may be useful in sorting the positive examples from the negative examples. The processor records the results of this operation in a file named (for convenience) Attribute_Values. This file contains a two-dimensional matrix in which Attribute_Values [i] [j] is the value of attribute j for the initial expression i, wherein i=0, . . . , N−1, and N is the total number of the examples.

Each row of Attribute_Values contains one output attribute, indicating whether the example is positive or negative, and K possible entries for input attributes. The output attribute, which is taken for convenience to be Attribute_Values [i] [0], is equal to 1 if the initial expression i is a positive example, or 0 if the initial expression i is a negative example. For convenience, Attribute_Values may be sorted so that Attribute_Values [i] [0]=1, for i=0, . . . , M−1, and Attribute_Values [i] [0]=0 for the remaining (N−M) records, wherein M is the number of positive examples.

Processor 24 culls the input attributes from the qualitative and quantitative encoding performed at step 70, which is illustrated above in Tables I and II. In the present embodiment, if k[i] is the number of codes in the sequence of codes in the example corresponding to the ith record of Attribute_Values (as per Table II), then the ith record will contain 2k[i]+1 input attributes. Attribute_Values [i] [1] contains the total number of codes in the sequence of codes for the ith examples. The subsequent even fields contain the indices of the basic codes (as listed, for example, in Table III), while the odd fields contain the code length of the code located in the previous field. Formally, if $\{(c_j^{(i)}, l_j^{(i)})\}$, j= 1, . . . , k[i], is the sequence of pairs {basic code index, length in the initial expression} for the ith record, then the ith row of the file Attribute_Values will contain:

TABLE IV

INPUT ATTRIBUTES

| | Attribute | | | | |
|---|---|---|---|---|---|
| | 1 | 2 | 3 | ... | 2·k[i] | 2·k[i] + 1 |
| Value | k[i] | $c_1^{(i)}$ | $l_1^{(i)}$ | ... | $c_{k[i]}^{(i)}$ | $l_{k[i]}^{(i)}$ |

In the Attribute_Values table as a whole, the total number of possible input attribute values in each row is $K=2·k_{max}+1$, wherein $$k_{max} = \max_{i=0, \ldots, N-1} k[i].$$

Applying this sort of attribute value analysis to the set of examples shown in Tables I and II gives the set of input attribute values shown below in Table V. The upper row gives the serial numbers of the attribute values:

TABLE V

| Example | \multicolumn{15}{c}{INPUT ATTRIBUTE VALUES} |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 |
| 0 | 1 | 1 | 4 |   |   |   |   |   |   |   |   |   |   |   |   |
| 1 | 1 | 0 | 5 |   |   |   |   |   |   |   |   |   |   |   |   |
| 2 | 2 | 1 | 3 | 3 | 1 |   |   |   |   |   |   |   |   |   |   |
| 3 | 2 | 0 | 1 | 1 | 5 |   |   |   |   |   |   |   |   |   |   |
| 4 | 3 | 1 | 2 | 2 | 1 | 3 | 1 |   |   |   |   |   |   |   |   |
| 5 | 4 | 1 | 4 | 2 | 1 | 1 | 2 | 0 | 2 |   |   |   |   |   |   |
| 6 | 7 | 0 | 6 | 2 | 1 | 0 | 5 | 2 | 1 | 0 | 5 | 2 | 1 | 0 | 3 |

The inventors have found that the set of attribute values that have been explained and derived above give useful results in subsequent derivation of an optimal decision tree for distinguishing between the positive and negative examples. Alternatively or additionally, other types of attribute values characterizing the set of initial expressions may be used. Furthermore, although the inventors have found the types of data structures described above to be convenient for capturing and organizing the attribute values, other data structures may be used for these purposes, as will be apparent to those skilled in the art.

For example, in addition to the specific attribute values described above, processor 24 may also extract attributes characterizing each expression as a whole. These attributes may include the total length of the expression, and may also the sequence of basic code indices and the sequence of lengths of codes in the expression. The total length $$L[i] = \sum_{j=1}^{k[i]} l_j^{(i)}$$

is equal to the sum of Attribute_Values [i] [j] for j=3 up to K with step=2. The sequence of basic code indices $c_1^{(i)}$, $c_2^{(i)}, \ldots, c_{k[i]}^{(i)}$ may be considered a code word, and processor 24 may compute the frequency of each such word among all the initial expressions. These code words may be sorted, typically in decreasing order of frequency, and thus assigned their own respective indices, which are then saved along with the corresponding code words. Analogously, the sequence of lengths of codes $l_1^{(i)}, l_2^{(i)}, \ldots, l_{k[i]}^{(i)}$ may be treated as another code word and indexed accordingly.

Processor 24 analyzes the attribute values collected at step 72 in order to find frequent code sequences, at an attribute processing step 74. "Code sequences" in this context refers to sequences of any of the attribute values described above, or of attribute values of other types. The sequences may be of any length. For example, the processor may consider pairs of successive basic code indices $\{c_j^{(i)}, c_{j+1}^{(i)}\}$. For each row i in Attribute_Values having the sequence of indices $c_1^{(i)}$, $c_2^{(i)}, \ldots, c_{k[i]}^{(i)}$, the following pairs of indices are considered: $\{c_1^{(i)}, c_2^{(i)}\}, \{c_2^{(i)}, c_3^{(i)}\}, \ldots, \{c_{k[i]-1}^{(i)}, c_{k[i]}^{(i)}\}$. Then, the frequencies of all the different pairs are computed over all rows of the matrix.

The processor selects those frequent index pairs that distinguish well between the positive and negative examples. For example, the processor may select a pair if it occurs in at least half of the positive examples, and if the percentage of the positive examples containing this pair of indices is at least twice the percentage of the negative examples that contain the pair. In other words, if $Q_{pos}$ is the number of positive examples containing the given pair of codes, and $Q_{neg}$ is the number of negative examples containing the pair, then the pair is selected if and only if both of the following conditions are met:

$$Q_{pos} \geq \frac{M}{2} \qquad (1)$$

$$\frac{Q_{pos}}{M} \geq \frac{2 \cdot Q_{neg}}{N - M} \qquad (2)$$

(wherein M is the total number of positive examples, and N is the total number of all examples).

Processor 24 may add the index pairs to the array of basic codes that was created at step 70 (as exemplified by Table III above). In other words, each frequent pair $\{c_1, c_2\}$ is listed and assigned its own index C in the table. The processor then scans the sequences of code indices $\{c_1^{(i)}, c_2^{(i)}, \ldots, c_{k[i]}^{(i)}\}$ in the Attribute_Values table and substitutes the appropriate value of C for each pair $\{c_1, c_2\}$ that it finds. The processor likewise updates the code length values in the table accordingly. The result of this scan gives a new set of attribute values for each of the examples.

If at least one frequent pair is found, the processor may search for frequent triples and add further entries to Attribute-Values in the same manner. The processor continues this procedure until it cannot find any longer sequences of code indices that distinguish between positive and negative examples, according to the criteria given above.

The method of FIG. 4 may be understood more concretely with reference to the example presented below. An exemplary set of initial expressions is listed in Table VI:

TABLE VI

POSITIVE AND NEGATIVE EXAMPLES

| Include in Pattern | Exclude from Pattern |
| --- | --- |
| 1 | 11 |
| 2½ | 2* |
| 3¼ | e |
| ⅔ |  |

The characters in the examples in Table VI receive the following internal codes:

TABLE VII

ARRAY OF BASIC CODES

| Character code | Frequency | Index |
|---|---|---|
| d | 12 | 0 |
| / | 3 | 1 |
| 1 | 1 | 2 |
| * | 1 | 3 |
| b | 1 | 4 |

Based on Tables VI and VII, the processor derives the following Attribute_Values matrix:

TABLE VIII

ATTRIBUTE_VALUE MATRIX

| 0 | 1 | 2 | 3 | 4 | 5 | 6 | 7 | 8 | 9 | 10 | 11 |
|---|---|---|---|---|---|---|---|---|---|---|---|
| 1 | 1 | 0 | 1 | | | | | | | | |
| 1 | 3 | 0 | 2 | 1 | 1 | 0 | 1 | | | | |
| 1 | 5 | 0 | 1 | 4 | 1 | 0 | 1 | 1 | 1 | 0 | 1 |
| 1 | 3 | 0 | 1 | 1 | 1 | 0 | 1 | | | | |
| 0 | 1 | 0 | 2 | | | | | | | | |
| 0 | 2 | 0 | 1 | 3 | 1 | | | | | | |
| 0 | 1 | 2 | 1 | | | | | | | | |

As explained above, the top row of the table contains the attribute indices; column 0 contains the output attribute for each example; column 1 contains the number of codes in the sequence of codes; columns 2, 4, 6, 8 and 10 contain the indices of the character codes; and columns 3, 5, 7, 9 and 11 each contain the length of the code in the preceding column.

It can be see in Table VIII that there are two frequent pairs of codes, {1,0} and {0,1}, and one frequent triple, {0,1,0}, that satisfy conditions (1) and (2) for distinguishing between positive and negative examples. In other words, the analysis has revealed the frequent code sequence d/d, which will now be coded, for example, as f. After substituting f for d/d in the initial examples, a new set of input attribute values is determined and added to Table VIII. For example, after assigning the index 5 to code f, the Attribute_Values matrix assumes the following form:

TABLE IX

MODIFIED ATTIBUTE_VALUE MATRIX

| 0 | 1 | 2 | 3 | 4 | 5 | 6 | 7 |
|---|---|---|---|---|---|---|---|
| 1 | 1 | 0 | 1 | | | | |
| 1 | 1 | 5 | 4 | | | | |
| 1 | 3 | 0 | 1 | 4 | 1 | 5 | 3 |
| 1 | 1 | 5 | 3 | | | | |
| 0 | 1 | 0 | 2 | | | | |
| 0 | 2 | 0 | 1 | 3 | 1 | | |
| 0 | 1 | 2 | 1 | | | | |

Figure 5:
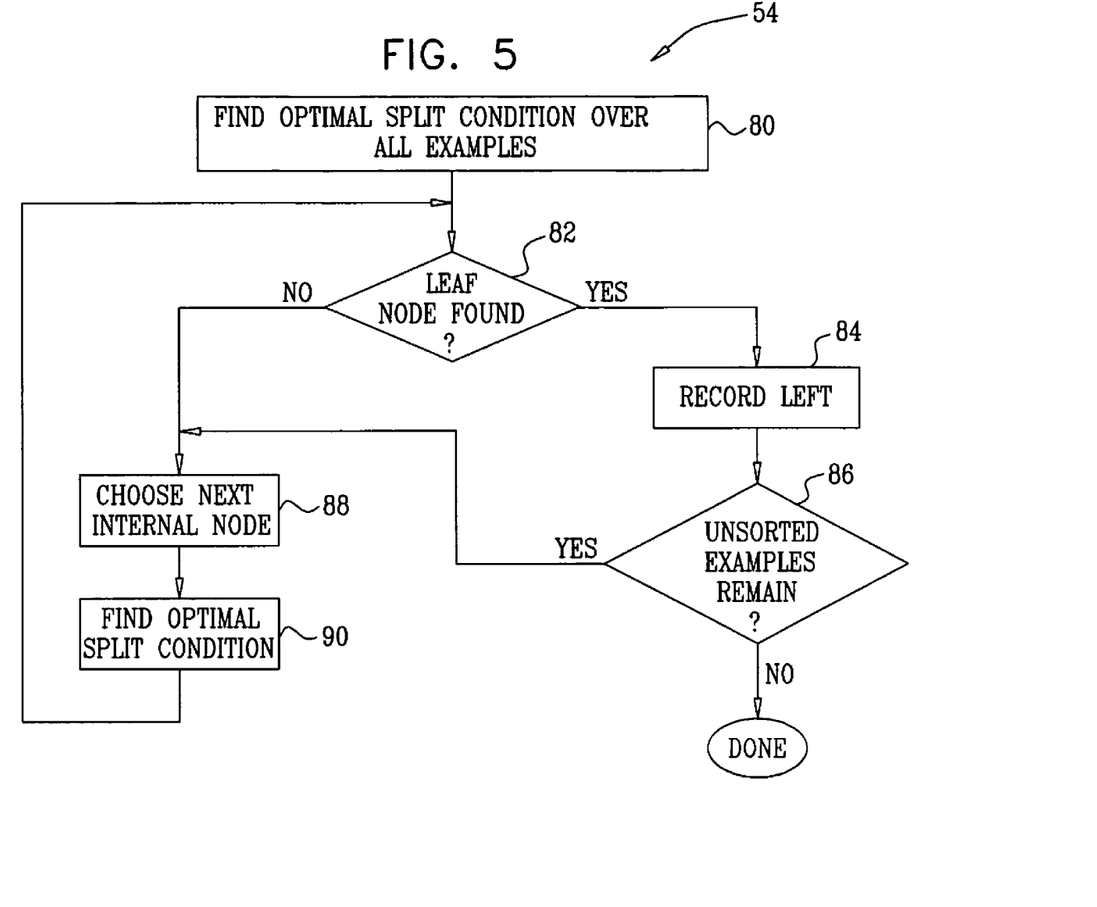
FIG. 5 is a flow chart that schematically illustrates a method for building an optimal decision tree, in accordance with an embodiment of the present invention.

FIG. 5 is a flow chart that schematically shows details of tree construction step 54, in accordance with an embodiment of the present invention. This step uses as its input the matrix of attribute values produced at step 52, as described above, and possibly other features of the initial examples and of the attribute value matrix itself. At step 54, processor 24 generates one or more data structures that represent the decision tree. In one embodiment, these data structures include:

Solution_split [p] [q]—This table contains a list of the splitting conditions that are applied at different nodes of the tree, typically in the form of conditions that are applied to certain columns of the Attribute_Values matrix. (Here p is a running index, while q refers to the parameters of the conditions.) The condition applied at each node typically determines whether a specified attribute value satisfies a specified equality or inequality relation. In other words, initial expressions i for which Attribute_Values [i] [j] satisfies the condition are sorted into one group (typically the predominantly positive group), while the remaining initial expressions are sorted into another group.

Pointers [r] [s]. This table describes the topology of the tree. For node r, Pointers [r] [0] contains the value p of the row in Solution_split [p] [q] containing the condition to be applied at the node, while Pointers [r] [1] and Pointers [r] [2] contain the values r' of the subsequent nodes for the respective cases in which the condition is true or false. If either (or both) of Pointers [r] [1] and Pointers [r] [2] contains a negative value, it indicates that the subsequent node in question is a leaf node. In this case, the inverse of the negative value (−r') is the number of the row in which this leaf is recorded in the Leaves [ ] table.

Leaves [t]—This table contains the parameters of each leaf node. Specifically, these parameters may indicate whether the leaf contains positive or negative examples, and possibly the total number of the initial expressions that are contained in the leaf (i.e., the expressions that passed all the decision conditions leading up to this leaf). Alternatively or additionally, the leaf parameters may indicate the number of the initial expressions that are contained in the leaf for which the output attribute Attribute_Values [i] [0] is 1, and/or the fraction for which the output attribute is 1 (or equivalently, the probability that the output attribute will be 1 after having traversed the decision tree to this leaf).

Alternatively, other sorts of data structures, as are known in the art, may be used to represent the decision tree. In the context of the present patent application and in the claims, the statement that a given node of the decision tree "contains" certain expressions means that these expressions have fulfilled the sequence of conditions encountered (i.e., each condition evaluates to true or false on the expressions as appropriate) in traversing the tree from the root to the node in question.

Processor 24 begins to construct the decision tree by finding the optimal condition to apply at the root node, at a root splitting step 80. For this purpose, the processor finds the best splitting condition on the values of each input attribute in Attribute_Values, and then chooses the best of these best conditions. The "best splitting condition" is the condition that separates the positive from the negative examples most decisively. In formal terms, if n is the number of examples satisfying a given condition, and among these n examples there are m positive examples, then the best condition is the one that maximizes the optimization criterion:

$$\rho = \rho(N, M, n, m) = \left| \frac{m \cdot N - n \cdot M}{\sqrt{n \cdot (N-n) \cdot M \cdot (N-M)}} \right| \qquad (3)$$

(wherein again, M is the total number of positive examples, and N is the total number of all examples).

Thus, at step 80, the processor finds the best splitting condition over all the attribute values in the file Attribute_Values [i] [j], for i=0, . . . , N−1 and j=0, . . . , K. The processor records the definition of the best splitting condition in the first row of the table Solution_split and records in Pointers [0] [0] the reference to the first row in Solution_split.

Processor 24 checks the results of the first split to determine whether either of the resulting groups of examples satisfies the criterion to be a leaf node, at a leaf evaluation 82. As noted earlier, a node is considered a leaf node if all (or nearly all) of the examples it contains are either positive (output attribute=1) or negative (output attribute=0). In other words, user 28 may set a small threshold percentage, such that if the fraction of negative examples contained in a given node is no greater than the threshold, then the node is considered by positive leaf node, and vice versa. Alternatively, if not all of the examples contained in a given node are either positive or negative, the user may set a minimum optimization criterion $\rho_{min}$, such that if no splitting condition can be found over these examples for which $\rho > \rho_{min}$, then the node is considered a leaf node. In this case, in other words, $\rho$ gives a measure of the effectiveness of the split. Whatever leaf criteria are used, if a leaf node is found, the processor records the leaf node in Leaves [ ] and records the appropriate negative pointer value in Pointers [ ] [ ]. In some cases, both of the child nodes resulting from a given split may be leaf nodes.

After recording a leaf node, the processor checks the remaining examples that have not yet been sorted into any leaf node in order to determine whether any unsorted example still remain, at a remainder checking step 86. If all the examples have been sorted into leaf nodes, step 54 is completed.

If there are remaining examples that do not yet belong to any leaf node (or if no leaf node was found at step 82), the processor proceeds to choose the next internal (non-leaf) node in the decision tree, at an internal node selection step 88. The processor adds a new row in Pointers [ ] [ ] to correspond to this node and sets the appropriate value in the row of Pointer [r] [s] belonging to the parent node to point to the new row. The set of examples that are contained in the new node can be defined by the Boolean vector V[i], i=0, . . . , N−1, wherein V[i]=1 if the record i is contained in this node, and V[i]=0, otherwise.

The processor then finds the optimal splitting condition for the set of examples in the new node, at an internal node splitting step 90. The optimal condition is again the one that maximizes $\rho$, as given by Equation (3), over all the attributes values of the examples for which V[i]=1. This procedure continues recursively, splitting each internal node into other internal nodes or leaf nodes, until all of the examples have been sorted into leaves of the tree.

Although the methods described above use certain particular attributes and techniques for extracting these attributes from the initial examples, the principles of the present invention may similarly be applied to sort examples and build decision trees based on attributes of other sorts. Furthermore, these methods may be used not only in sorting and mastering data in databases, as in the examples described above, but also in other applications in which it is necessary to identify and evaluate patterns and sort large collections of data elements. For example, the methods described above may be used in data normalization and standardization in order to transform the contents of description type fields into an aggregate of structured attribute values.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for processing data comprising character strings, the method comprising:
   receiving an input from a user comprising positive examples and negative examples of a specified data type, the positive examples comprising first character strings that belong to the specified data type, and the negative examples comprising second character strings that do not belong to the specified data type, wherein receiving the input comprises displaying a collection of the character strings, and accepting from the user an indication of which of the character strings to include in the specified data type and which of the character strings to exclude from the specified data type;
   processing the first and second character strings to create a set of attributes that characterize the positive examples, wherein the processing comprises:
      assigning a different character code from character codes to each character type of characters forming the first and second character strings; and
      encoding the first and second character strings as sequences of the character codes without distinguishing between sequential characters of the same type, wherein one character code is assigned to letters and another character code is assigned to digits;
   building a decision tree, based on the attributes, which when applied to the first and second strings, distinguishes the positive examples from the negative examples; and
   applying the decision tree to the data so as to classify a character string of the character strings as belonging to the specified data type.

2. The method according to claim 1, wherein each of the character strings comprises one or more character sequences, each character sequence having a length and comprising characters of a single, given character type, and wherein processing the first and second character strings comprises encoding each character string to indicate character types and lengths of the character sequences in the character string.

3. The method according to claim 2, wherein the sequences of the character codes comprise ordered groups of two or more of the character codes that comprise different, respective character types.

4. The method according to claim 1, wherein processing the first and second character strings comprises choosing the attributes such that at least a predetermined fraction of the positive examples is characterized by the chosen attributes, and such that a larger fraction of the positive examples than of the negative examples is characterized by the chosen attributes.

5. The method according to claim 1, wherein building the decision tree comprises choosing splitting conditions for application at the nodes of the decision tree so that the decision tree is an optimal decision tree.

6. The method according to claim 5, wherein the decision tree comprises a root node, internal nodes, and leaf nodes, and wherein choosing the splitting conditions comprises finding a respective optimal splitting condition at the root node and at each of the internal nodes.

7. The method according to claim 6, wherein finding the respective optimal splitting condition comprises, at each node among the root and internal nodes, choosing one of the attributes and the optimal splitting condition for application to the one of the attributes so as to maximize an optimization criterion for separating the positive examples contained in the node from the negative examples contained in the node.

8. The method according to claim 6, wherein building the decision tree comprises determining one of the nodes to be a leaf node when the node contains only positive examples or only negative examples.

9. The method according to claim 6, wherein building the decision tree comprises determining one of the nodes to be a leaf node when there is splitting condition that will separate the positive examples contained in the leaf node from the negative examples contained in the leaf node with an effectiveness greater than a predetermined minimum optimization criterion.

10. The method according to claim 1, wherein applying the decision tree comprises receiving further input from the user indicating errors made by the decision tree in classifying the character string as belonging to the specified data type, and refining the decision tree using the further input.

11. The method according to claim 1, wherein applying the decision tree, comprises constructing a regular expression based on the decision tree, and applying the regular expression to the data.

12. The method according to claim 1, wherein applying the decision tree to the data comprises identifying occurrences of the specified data type and using the occurrences to identify duplications in records in a database, and resolving the duplications.

13. Apparatus for processing data comprising character strings, comprising:
    a user interface, which is coupled to receive an input from a user comprising positive examples and negative examples of a specified data type, the positive examples comprising first character strings that belong to the specified data type, and the negative examples comprising second character strings that do not belong to the specified data type, wherein the user interface is arranged to display a collection of the character strings, and to accept from the user an indication of which of the character strings to include in the specified data type and which of the character strings to exclude from the specified data type; and
    a pattern processor, which is arranged to:
        process the first and second character strings to create a set of attributes that characterize the positive examples, wherein the processing comprises:
            assigning a different character code from character codes to each character type of characters forming the first and second character strings, and
            encoding the first and second character strings as sequences of the character codes without distinguishing between sequential characters of the same type, wherein one character code is assigned to letters and another character code is assigned to digits;
        build a decision tree, based on the attributes, which when applied to the first and second strings, distinguishes the positive examples from the negative examples; and
        apply the decision tree to the data so as to classify a character string of the character strings as belonging to the specified data type.

14. The apparatus according to claim 13, wherein each of the character strings comprises one or more character sequences, each character sequence having a length and comprising characters of a single, given character type, and wherein the processor is arranged to encode each character string to indicate the character types and lengths of the character sequences in the character string.

15. The apparatus according to claim 14, wherein the sequences of the character codes comprise ordered groups of two or more of the character sequences that comprise different, respective character types.

16. The apparatus according to claim 13, wherein the processor is arranged to choose the attributes such that at least a predetermined fraction of the positive examples is characterized by the chosen attributes, and such that a larger fraction of the positive examples than of the negative examples is characterized by the chosen attributes.

17. The apparatus according to claim 13, wherein the processor is arranged to choose splitting conditions for application at the nodes of the decision tree so that the decision tree is an optimal decision tree.

18. The apparatus according to claim 17, wherein the decision tree comprises a root node, internal nodes, and leaf nodes, and wherein the processor is arranged to find a respective optimal splitting condition at the root node and at each of the internal nodes.

19. The apparatus according to claim 18, wherein the processor is arranged to find the respective optimal splitting condition by choosing, at each node among the root and internal nodes, one of the attributes and the optimal splitting condition for application to the one of the attributes so as to maximize an optimization criterion for separating the positive examples contained in the node from the negative examples contained in the node.

20. The apparatus according to claim 18, wherein the processor is arranged to determine one of the nodes to be a leaf node when the node contains only positive examples or only negative examples.

21. The apparatus according to claim 18, wherein the processor is arranged to determine one of the nodes to be a leaf node when there is splitting condition that will separate the positive examples contained in the leaf node from the negative examples contained in the leaf node with an effectiveness greater than a predetermined minimum optimization criterion.

22. The apparatus according to claim 13, wherein the user interface is coupled to receive further input from the user indicating errors made by the decision tree in classifying the character string as belonging to the specified data type, and wherein the processor is arranged to refine the decision tree using the further input.

23. The apparatus according to claim 13, wherein the processor is arranged to construct a regular expression based on the decision tree, and to apply the regular expression to the data.

24. The apparatus according to claim 13, wherein the processor is arranged to identify occurrences of the specified data type and use the occurrences to identify duplications in records in a database, and to resolve the duplications.

25. A computer software product for processing data comprising character strings, the product comprising a computer-readable storage medium in which program instructions are stored, the program instructions, when executed by a computer, cause the computer to:
    receive an input from a user comprising positive examples and negative examples of a specified data type, the positive examples comprising first character strings that belong to the specified data type, and the negative examples comprising second character strings that do not belong to the specified data type, wherein the instructions cause the computer to display a collection of the character strings, and to accept from the user an indication of which of the character strings to include in the specified data type and which of the character strings to exclude from the specified data type;
process the first and second character strings to create a set of attributes that characterize the positive examples, wherein the processing comprises:
assigning a different character code from character codes to each character type of characters forming the first and second character strings, and
encoding the first and second character strings as sequences of the character codes without distinguishing between sequential characters of the same type, wherein one character code is assigned to letters and another character code is assigned to digits;
build a decision tree, based on the attributes, which when applied to the first and second strings, distinguishes the positive examples from the negative examples; and
apply the decision tree to the data so as to classify a character string of the character strings as belonging to the specified data type.

26. The product according to claim 25, wherein each of the character strings comprises one or more character sequences, each character sequence having a length and comprising characters of a single, given character type, and wherein the instructions cause the computer to encode each character string to indicate character types and lengths of the character sequences in the character string.

27. The product according to claim 26, wherein the sequences of the character codes comprise ordered groups of two or more of the character sequences that comprise different, respective character types.

28. The product according to claim 25, wherein the instructions cause the computer to choose the attributes such that at least a predetermined fraction of the positive examples is characterized by the chosen attributes, and such that a larger fraction of the positive examples than of the negative examples is characterized by the chosen attributes.

29. The product according to claim 25, wherein the instructions cause the computer to choose splitting conditions for application at the nodes of the decision tree so that the decision tree is an optimal decision tree.

30. The product according to claim 29, wherein the decision tree comprises a root node, internal nodes, and leaf nodes, and wherein the instructions cause the computer to find a respective optimal splitting condition at the root node and at each of the internal nodes.

31. The product according to claim 30, wherein the instructions cause the computer to find the respective optimal splitting condition by choosing, at each node among the root and internal nodes, one of the attributes and the optimal splitting condition for application to the one of the attributes so as to maximize an optimization criterion for separating the positive examples contained in the node from the negative examples contained in the node.

32. The product according to claim 30, wherein the instructions cause the computer to determine one of the nodes to be a leaf node when the node contains only positive examples or only negative examples.

33. The product according to claim 30, wherein the instructions cause the computer to determine one of the nodes to be a leaf node when there is splitting condition that will separate the positive examples contained in the leaf node from the negative examples contained in the leaf node with an effectiveness greater than a predetermined minimum optimization criterion.

34. The product according to claim 25, wherein the instructions cause the computer to receive further input from the user indicating errors made by the decision tree in classifying the character string as belonging to the specified data type, and to refine the decision tree using the further input.

35. The product according to claim 25, wherein the instructions cause the computer to construct a regular expression based on the decision tree, and to apply the regular expression to the data.

36. The product according to claim 25, wherein the instructions cause the computer to apply the decision tree to the data so as to identify occurrences of the specified data type and use the occurrences to identify duplications in records in a database, and to resolve the duplications.

* * * * *